Patented Apr. 3, 1928.

1,665,105

UNITED STATES PATENT OFFICE.

ROBERT MEZGER, OF STUTTGART, GERMANY.

PRODUCING STABLE EMULSIONS.

No Drawing. Application filed April 1, 1927, Serial No. 180,330, and in Germany July 1, 1925.

My invention refers to emulsions, and embraces especially emulsions of the kind in which tar, pitch, asphalt, petroleum oils and residues are combined with water. Its particular object is to provide means whereby concentrated watery emulsions of this kind can be easily produced which are substantially permanently stable in the sense that the emulsion once obtained will not suffer de-composition or separation of its components. While oils consisting essentially of hydrocarbons are mentioned, the invention is also applicable to all kinds of oily materials.

As is well known to those skilled in the art, emulsions produced in the manner heretofore practiced, when being allowed to stand for some time, will become divided into two layers, thereby forming two emulsions of different specific gravities and in order to put such emulsions to practical use they had to be shaken or well agitated beforehand, preferably by mechanical means, in order to render the product homogeneous. This phenomenon of voluntary separation is particularly noticeable in water emulsions containing tar. If the constituents are mixed in predetermined proportions and suitable emulsifying agents are added it is easy to produce an emulsion which will remain unchanged for a short time, say up to a few hours but which after this period will separate within a few days into the two emulsions mentioned as above stated, having different specific gravities.

I have now ascertained that if an emulsion prepared in accordance with the above is allowed to stand the product will separate itself into two layers, an upper and a lower, both of which are actually emulsions, and the two emulsions (upper and lower, respectively) separating out after some time will each always have substantially the same composition. Thus the emulsion made by thoroughly mixing a given batch of ingredients together (termed a "primary emulsion"), will by standing, separate or stratify into two stable emulsions (hereinafter termed "end emulsions") each of which is stable for a long period. One end emulsion contains much oil and is uniform as to composition. The other end emulsion contains only a little oil, and is uniform as to composition. These two separated parts of the emulsion, which hereinafter will be termed "end emulsions" are both very stable and remain substantially unchanged even for many months. For economic reasons a tar emulsion designed to be shipped for great distances must be as rich as possible in tar. On the other hand, highly stable concentrated end emulsions containing tar (or equally stable emulsions of the same composition as these end emulsions) cannot in the majority of cases be produced by directly mixing their components in the same proportions. According to the present invention now, I have succeeded in preparing in an easy and simple manner watery concentrated tar emulsions, being end emulsions which will remain substantially unchanged for an infinite time by (a) mixing the constituents in the proportion best adapted for complete emulsification, then (b) allowing the emulsion to separate into the two end emulsions, (c) removing the richer emulsion for use, and (d) utilizing the emulsion poorer in oil (with additional amounts of oil and preferably with additional amounts of emulsifying agent) in a new emulsifying operation after which steps (b), (c), and (d) are repeated, as often as desired, more water being added in each cycle, or as often as desired.

The following examples are given in an illustrative and not restrictive sense. The parts are by weight (except where otherwise stated).

*Example 1.*—50 kgs. of coal tar freed by distillation from water, light oil and part of the heavier oils, are intimately mixed by vigorous stirring (or other efficient mixing) at about 60° C., with 1 kg. of oleic acid. The oleic acid dissolves in the tar. To this mixture is added (preferably in small portions) a solution of 300 grams of soda ash (carbonate) in 50 liters of water, the stirring being continued until a homogeneous brown emulsion has formed which is completely mixable with water. This is allowed to stand. After 48 hours standing this emulsion will have neatly separated into two layers, namely (a) 40 kgs. of a dilute end emulsion containing about 10% tar, the reaction products of 0.06% soda ash, with 0.2% oleic acid and 89.7% water, and (b) 60 kgs. of a concentrated end emulsion containing about 75% of tar, the reaction products of 1.5% oleic acid, with 0.46% soda ash and 23% water. The dilute emulsion is now separated from the concentrated emulsion and is utilized anew in a further emulsifying operation with more of the tarry material like that used in the first step, and preferably also with more of the emulsifying agent, while the concentrated emulsion can be shipped or stored without danger of its concentration or character being altered.

The second emulsification can be carried out as follows:

80 kgs. of coal tar as in the above example are mixed with 1.6 kg. of oleic acid, and to this 100 kgs. of weak emulsion in which 480 grams of soda ash have been dissolved are added. This is then violently stirred or agitated to form a brown homogeneous emulsion, which can then be settled, separated and treated as above described.

The poor end emulsion, produced by settling in each stage, can be used, preferably with additional emulsifying agent, in producing a new emulsion, to be subsequently settled and separated into two end emulsions, the poorer one reused in making a new emulsion to be similarly treated.

*Example 2.*—55 parts of coal tar pitch are mixed with 45 parts of anthracene oil. This mixture is treated with (say 2 parts of) oleic acid, (say 0.6 parts of) soda ash and (say 100 parts of) water as described with reference to Example 1, and a similar product is obtained which is settled, drawn off etc., as in Example 1.

*Example 3.*—15 kgs. of petroleum pitch and 40 kgs. of coal tar pitch are dissolved in hot condition in 45 kgs. of anthracene oil and 3 kgs. of oleic acid. This solution is cooled down to about 70° C. and a solution of 600 grams of caustic soda in 40 liters of water is gradually and slowly added under vigorous stirring until the organic constituents have undergone complete emulsification in the water. After standing three days this emulsion is found to be separated into two end emulsions similar to those described with references to Example 1. In this case as well the dilute end emulsion is utilized in a subsequent operation (similar to that described under Example 1) for preparing another concentrated emulsion, its contents of bitumen, pitch and soap being considered when calculating the further amounts of these constituents and of oleic acid and soda, to be used in the new emulsification.

I wish it to be understood that I do not desire to be limited to the exact substances, proportions and sequences of operations described for obvious modifications will occur to a person skilled in the art.

I have above referred to oleic acid, but other fatty acids so for instance those prepared from cotton seeds, peanuts, fish oil can be used, or other emulsifying agents instead of fatty acid as organic sulpho- and sulphonic acids or ordinary rosin and alkali can be employed. The use of the fatty acids and alkali are found to give very satisfactory results, and I accordingly prefer them in actual practice.

Other oils besides those above mentioned, can be used, e. g. other hydrocarbon oils, fatty oils, or any kind of oil capable of being emulsified. The term "oil" is hereinafter used in the broad sense.

It will be understood that the stable end emulsions produced by settling of the primary emulsions are far more stable than any emulsion that can be prepared, by any methods known to me, directly from the same components in the proportions in which they are present in the said stable end emulsions. This is true also and in particular, as to the end emulsions of high oil content.

I have above spoken of allowing the primary emulsion to stand a few days to stratify by simple gravity separation. It will be obvious that other methods of specific gravity separation, centrifugation, etc., can be used, if desired. Simply standing for a few days, is generally a cheap and efficient method to employ.

The term "tarry substance" used in certain of the claims is designed to include coal tar, coal tar pitch, petroleum pitch, anthracene oil, and all other kinds of tarry products.

The present application is in part a continuation of my copending case, Serial No. 118,854, filed in the United States June 26, 1926, (corresponding to a German application filed July 1, 1925).

I claim.—

1. The method of preparing stable oil emulsions comprising mixing the constituents so as to effect emulsification, allowing the emulsion to stratify into two end emulsions, removing the end emulsion which is richer in oily material and emulsifying more oil with the end emulsion which is poorer in oil, in a new emulsifying operation.

2. The method of preparing stable emulsions of oily material comprising mixing the constituents in the proportion best adapted for complete emulsification, such mixing being sufficiently violent to produce an emulsion, allowing the emulsion to stratify into two end emulsions respectively richer and poorer in oily material, removing the end emulsion richer in oily material and well mixing together the end emulsion which is poorer in oily material, more oily material and more emulsifying agent, to form a new emulsion.

3. The method of preparing a stable emulsion of a tarry substance comprising mixing a tarry substance with water and an emulsifying agent, emulsifying the mixture, allowing the emulsion thus obtained to stratify into two end emulsions respectively richer and poorer in tarry substance, removing the end emulsion richer in tarry substance and emulsifying more tarry substance with the end emulsion poorer in tarry substance as a new emulsifying operation, and again allowing stratification.

4. The method of preparing a stable emulsion of a tarry substance comprising mixing a tarry substance with a fatty acid and an alkaline substance and water, converting the mixture into a primary emulsion, allowing said emulsion thus obtained to stratify into two end emulsions, separating the end emulsion richer in tarry substance from the end emulsion poorer in tarry substance, and emulsifying the latter with more tarry substance, in a new emulsifying operation.

5. The method of preparing a stable emulsion of a tarry substance comprising mixing a tarry substance with oleic acid and an alkaline substance and water, under conditions sufficient to emulsify the tarry substance, allowing the emulsion thus obtained to stratify into two end emulsions, removing the end emulsion richer in tarry substance and emulsifying tarry material with the end emulsion poorer in tarry substance in a new emulsifying operation.

6. The method of preparing a stable emulsion of a tarry substance comprising mixing a tarry substance with oleic acid and soda solution sufficiently to emulsify the tarry substance, allowing the emulsion thus obtained to stratify into two end emulsions, removing the end emulsion richer in tarry substance and forming a new emulsion from the end emulsion poorer in tarry substance, more tarry substance, and emulsifying agent, by well mixing the same in a new emulsifying operation.

7. The method of preparing a stable emulsion of a tarry substance comprising mixing a tarry substance with an emulsifying agent, emulsifying the mixture, allowing the emulsion thus obtained to stratify into two end emulsions respectively richer and poorer in tarry substance, removing the end emulsion richer in tarry substance and separately removing the emulsion poorer in tarry substance.

8. In the process of claim 4, the steps of well mixing together (a) an end emulsion poor in tarry substance, (b) tarry substance, (c) fatty acid and (d) alkali, in amounts sufficient to produce a new emulsion, then again allowing stratification into end emulsions, and repeating these steps with the new end emulsion poor in tarry substance.

9. The method of preparing stable oil emulsions comprising mixing the constituents so as to effect emulsification, allowing the emulsion to stratify into two end emulsions, removing the end emulsion which is richer in oil, adding emulsifying agents and more oil to the end emulsion which is poorer in oil and emulsifying such mixture, in a new emulsifying operation.

10. The method of preparing a stable emulsion of a tarry substance comprising mixing a tarry substance with watery material and an emulsifying agent, emulsifying the mixture, allowing the emulsion thus obtained to stratify into two end emulsions respectively richer and poorer in tarry substance, removing the end emulsion richer in tarry substance, adding more emulsifying agent and more tarry substance to the end emulsion poorer in tarry substance and emulsifying such mixture as a new emulsifying operation.

11. The method of preparing a stable emulsion of a tarry substance comprising mixing a tarry substance with a fatty acid and an alkaline substance and watery material, converting the mixture into a primary emulsion, allowing said emulsion thus obtained to stratify into two end emulsions, separating and removing the end emulsion richer in tarry substance from the emulsion poorer in tarry substance, and adding more emulsifying agent and tarry substance to the latter, and emulsifying such mixture, in a new emulsifying operation.

12. The method of preparing a stable emulsion of tarry substance comprising mixing a tarry substance with oleic acid and an alkaline substance and water, under conditions sufficient to emulsify the tarry substance, allowing the emulsion thus obtained to stratify into two end emulsions, removing the end emulsion richer in tarry substance and emulsifying tarry substance with the end emulsion poorer in tarry substance and a further quantity of emulsifying agent, in a new emulsifying operation.

13. In the art of making stable emulsions, the herein described process which comprises first well mixing together (a) oily material, (b) an acid of the group including fatty acid, organic sulfo acid, sulfonic acid, and rosin, (c) an aqueous liquid and (d) an alkali, to produce a primary emulsion, thereafter causing such primary emulsion to stratify into two end emulsions, respectively richer and poorer in oily material, and separating such two end emulsions, performing a new emulsifying operation by well mixing the end emulsion from said earlier steps which is poorer in oil with more alkali, more oily material and more of the acid of the group above defined, until a second primary emulsion is produced, and causing such second primary emulsion to stratify.

In testimony whereof I affix my signature.

ROBERT MEZGER.